APPARATUS FOR TRANSFERRING PULSE INFORMATION

Filed May 29, 1952 3 Sheets-Sheet 1

INVENTOR
MUNRO K. HAYNES
BY Charles P. Boberg
ATTORNEY

Dec. 27, 1960 M. K. HAYNES 2,966,661

APPARATUS FOR TRANSFERRING PULSE INFORMATION

Filed May 29, 1952 3 Sheets-Sheet 2

INVENTOR
MUNRO K. HAYNES

BY Charles P. Boberg
ATTORNEY

Dec. 27, 1960 M. K. HAYNES 2,966,661

APPARATUS FOR TRANSFERRING PULSE INFORMATION

Filed May 29, 1952 3 Sheets-Sheet 3

INVENTOR
MUNRO K. HAYNES
BY Charles P. Boberg
ATTORNEY

United States Patent Office 2,966,661

Patented Dec. 27, 1960

2,966,661

APPARATUS FOR TRANSFERRING PULSE INFORMATION

Munro K. Haynes, Poughkeepsie, N.Y., assignor to International Business Machines Corporation, New York, N.Y., a corporation of New York Filed May 29, 1952, Ser. No. 290,677

26 Claims. (Cl. 340—174)

This invention relates to information handling systems of the type in which binary information is stored progressively in a plurality of consecutive stages, each stage comprising a magnetic binary element or a combination of magnetic binary elements, and it relates particularly to devices for controlling the transfer of pulses representing stored binary information between adjoining stages.

A magnetic binary element consists essentially of a transformer having a core with the properties of high residual magnetism and low coercive force. A core of this type can be magnetized readily in one direction for storing a binary "1" and in the opposite direction for storing a binary "0." An ideal core material for this purpose would be one having a substantially rectangular hysteresis loop. If the binary element is in its normal "0" state, and a "1" is to be stored therein, a read-in pulse is applied to the primary winding of the transformer for reversing the flux in the core. When the stored "1" is to be read out, a read-out pulse is applied to the transformer for again reversing the magnetic state of the core. The resultant change of magnetic flux in the core (from the "1" state back to the "0" state) induces an output voltage pulse in a secondary winding of the transformer. If a "0" had been stored in the element prior to application of the read-out pulse thereto, there would (theoretically) be no change of magnetic flux in the core; consequently, no output pulse would be produced.

It is common practice to arrange magnetic binary elements in consecutive stages, with each stage comprising a single element or a combination of elements adapted to furnish a single output. Each pair of adjoining stages is coupled together by a transfer circuit whereby a change in the condition of the binary element or elements in one stage may effect a change in the condition of a binary element in the next stage. A simple example of this would be an information delay line or shifting register comprising a series of stages in which each stage contains a single magnetic element that normally is in its binary "0" state. To enter a binary "1" in any stage, a read-in pulse is applied to a primary winding of the binary element in that stage for reversing the magnetic flux in the core thereof. To read out the binary "1" stored in any stage, a read-out pulse is applied to a primary winding of the respective binary element for again reversing the magnetic flux in the core, thereby restoring the element to its initial "0" state. The voltage pulse which is induced in the secondary or output winding of the element when it is restored from its binary "1" state to its binary "0" state is applied as a transfer pulse to the read-in winding of the binary element in the next succeeding stage, causing the latter element to change from its "0" state to its "1" state.

Another form of apparatus in which it may be desired to use magnetic binary elements is logical circuitry, the purpose of which is to determine whether or not incoming bits of information concurrently satisfy a given set of test conditions. An example of this would be a logical "and" circuit wherein it is required that all of a plurality of elements in one stage be activated simultaneously as a condition for the activation of the next stage. The present invention contemplates the use of binary elements for performing functions of this kind. In this case the problem is to provide some means for detecting whether the combined output of a plurality of binary elements in one stage satisfies the requirements for a valid transfer of binary pulse information to the next stage.

In order that magnetic binary elements can be used successfully in the various forms of apparatus which have been described thus far, it is essential that each of the transfer circuits which couple the adjacent stages of a system be capable of passing normal transfer pulses between stages while discriminating against spurious pulses which are not generated strictly in accordance with the desired conditions for a valid transfer. As specific examples of this problem, attention will be given herein to the following:

(*a*) During the read-out of a binary "1" stored in any stage other than the first stage, a "back transfer" pulse is induced in the primary read-in winding of the binary element wherein the "1" was stored, and this back transfer pulse tends to enter a spurious "1" into the preceding stage. Since back transfers are undesirable in most, if not all, instances, provision must be made to suppress pulses of this character.

(*b*) Due to the fact that no core material has a perfectly rectangular hysteresis loop, there will be a small change of magnetic flux as the core goes from its negative stable state to its negative saturation state during the application of a read-out pulse to a binary element in which a "0" is stored. This change of flux induces a "read-out zero" pulse in the output winding, and while this pulse is smaller than the normal transfer pulse which occurs when the element is switched from "1" to "0," it may be sufficient to enter a spurious "1" into the next succeeding stage if not suppressed.

(*c*) In proposing the use of magnetic binary elements for logical circuits, one is confronted with the fact that some form of output pulse may be produced by a combination of binary elements during the read-out interval even though the elements have not been activated strictly in accordance with the conditions of the logical test. Therefore, some provision must be made for rejecting those output pulses that do not represent a full compliance with the conditions of the test.

The prior art has proposed the use of pulse discriminators to prevent back transfers but has not given adequate attention to the problems of suppressing or rejecting other forms of spurious pulses, such as those mentioned in paragraphs (*b*) and (*c*) above. These deficiencies have hindered the development of this art despite the well known advantages of magnetic binary elements over other types of storage devices.

Accordingly, it is a principal object of this invention to provide improved apparatus utilizing magnetic binary elements for the transfer of information by voltage pulses, said apparatus having a fixed and reliable threshold response for discriminating against all pulses other than valid transfer pulses.

A further object is to provide a novel pulse discriminator for the aforesaid purpose which will suppress "read-out zero" pulses as well as back transfer pulses.

A still further object is to provide novel means for selectively activating a plurality of magnetic binary elements, combining the output voltages thereof and measuring the combined output voltage with a fixed and reliable threshold voltage to determine whether or not the elements have been activated in accordance with a given set of conditions.

Another object is to provide improved logical circuitry using magnetic binary elements and including novel provisions for suppressing the "reject" pulses and other spurious pulses mentioned hereinabove.

Still another object is to provide an improved pulse discriminator according to any of the foregoing objects which is characterized by the following additional features:

(a) Negligible power consumption.
(b) Not critical in its design requirements.
(c) More rapid in its operation than prior transfer circuits.
(d) Operable at or near ground potential.

Other objects of the invention will be pointed out in the following description and claims and illustrated in the accompanying drawings, which disclose, by way of examples, the principle of the invention and the best mode, which has been contemplated, of applying that principle.

The term "binary," as used herein, should be understood in its broad sense as denoting a type of switching action between two stable states of a storage element. It is not intended that the invention be limited by the use of this term to systems for handling binary-coded information only.

Figure 1:
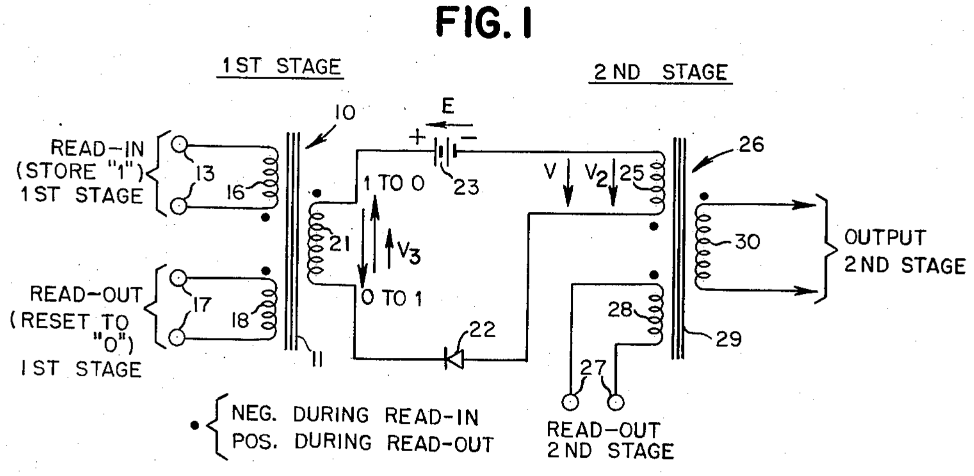
Fig. 1 is a schematic representation of a two-stage magnetic binary storage apparatus having a biased-diode transfer circuit that embodies the principle of the invention.

Fig. 1 shows the circuit connections for a two-stage magnetic binary storage apparatus having a biased-diode transfer circuit that is adapted to pass a normal transfer pulse and to discriminate against all other pulses that attempt to pass between the two stages. The storage element 10 in the first stage comprises a binary transformer in which the core 11 is made of a ferromagnetic material having a substantially rectangular hysteresis curve. The ideal magnetization characteristic for such a core material is represented by the solid lines in Fig. 3, which is a plot of the magnetic flux density B against the applied magnetizing force H. It will be assumed for the time being that the core 11 behaves in accordance with this characteristic. In the normal clear condition of the storage element 10, the magnetic polarity of the core 11 is indicative of a stored "0." Referring to the idealized hysteresis loop, Fig. 3, this condition of the core 11 is represented by the negative quiescent point 12.

To store a binary "1" in the storage element 10, a read-in pulse is applied to the input terminals 13, Fig. 1, thereby energizing a read-in winding 16 on the core 11. The read-in pulse is of such magnitude that it causes the magnetizing force H, Fig. 3, to be increased positively beyond the value of the minimum coercive force (+H1) needed for reversing the magnetic flux in the core 11. Assuming that such a magnetizing force is applied to the core 11 by the winding 16, Fig. 1, the flux density B of the core changes from the negative quiescent point 12, Fig. 3, to the positive saturation point 15. When the read-in pulse, subsides, the magnetic state of the core 11 returns to the positive quiescent point 16, Fig. 3. The magnetic polarity of the core 11, Fig. 1, is now such that a binary "1' is stored in the element 10.

To read out the binary "1" stored in the element 10, it is necessary to "reset" the core 11 by reversing the magnetic flux therein. This is accomplished by applying a read-out pulse to the terminals 17, Fig. 1, thereby energizing a read-out winding 18 on the core 11 to set up a magnetic field in the negative direction. Assuming that the magnetizing force in the negative direction sufficiently exceeds the minimum coercive force (—H1, Fig. 3) needed for a reversal of flux, the magnetic flux density passes from the positive quiescent point 16 to the negative saturation point 20, thereafter returning to the negative quiescent point 12 when the read-out pulse subsides.

The binary transformer 10 has a secondary or output winding 21, Fig. 1, which is part of a series transfer circuit that includes a germanium diode 22 (or other suitable rectifier), a source of electromotive force E (represented by the battery 23), and the read-in winding 25 of the magnetic binary storage element 26 in the second stage. The principal function of this transfer circuit is to enter a pulse representing a binary "1" into the second storage element 26 when the first storage element 10 is cleared, thereby transferring the stored "1" from the first stage to the second stage. That is to say, this transfer circuit will enable a normal transfer pulse to pass from the winding 21 to the winding 25, Fig. 1, whenever the storage element 10 is restored from its binary "1" state to its binary "0" state.

It should be mentioned at this point that when the storage element 10 was switched from its "0" state to its "1" state, a voltage pulse was induced in the secondary winding 21, but the polarity of this pulse was such that the diode 22 prevented any current flow from taking place. When the storage element 10 is cleared, going from its "1" state back to its "0" state, the voltage induced in the winding 21 is of such polarity that the upper end of the winding 21 is positive, as indicated by the dot in Fig. 1. Hence, this voltage pulse (which is identified as the "normal transfer" pulse) is not opposed by the diode 22.

The dot which is placed near one end of each winding in Fig. 1, and in the other schematic views, indicates that the adjacent end of that winding has a negative polarity during the read-in of a binary "1," and a positive polarity during the read-out of a binary "1" stored in that particular element.

In accordance with the principle of the invention, an electromotive force E supplied by the battery 23 (or equivalent voltage source) acts in continuous opposition to the diode 22. This serves to bias the diode 22, providing a fixed and reliable threshold voltage which any proposed transfer pulse must exceed by a predetermined amount in order to produce a significant current flow through the winding 25 of the second storage element 26. The battery symbol which is employed here is intended to represent any source of steady bias voltage having a negligible internal impedance. In some instances this will be referred to as a "fixed" voltage source, to distinguish it from a known type of pulsating voltage source comprising an impedance element through which a current pulse is sent to produce a desired voltage drop. It should be noted that the voltage source 23 is not required to furnish any power; hence it does not have stringent design requirements.

Figure 2:
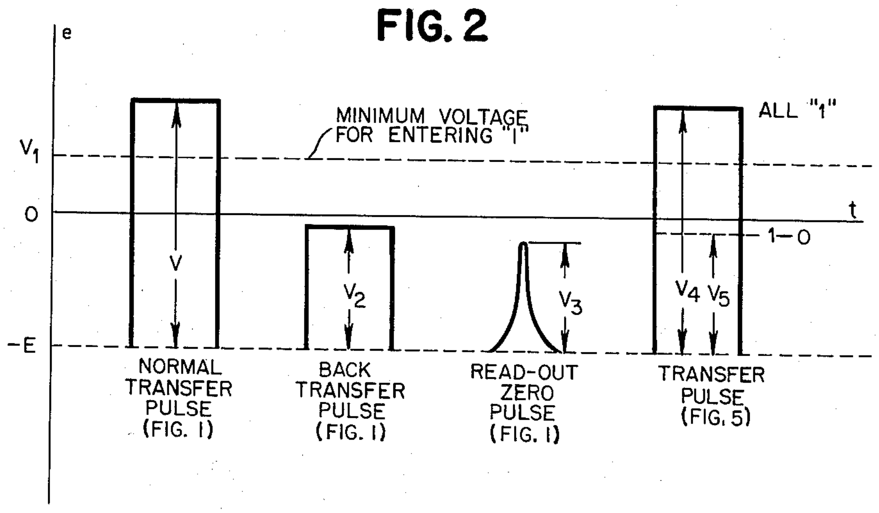
Fig. 2 is a graphical representation of various voltage pulses which are involved in the operations of the circuits disclosed herein.

Referring to Fig. 2, the voltage pulse V which is induced in the winding 21, Fig. 1, when the storage element 10 is reset from "1" to "0," has a magnitude sufficient to overcome the electromotive force E of the battery 23, thereby producing a flow of current through the winding 25 of the storage element 26. The difference between the voltage V and the electromotive force E is sufficient to exceed the minimum value of voltage (V1) which is required for entering a binary "1" into the storage element 26.

When it is desired to read out the binary "1" stored in the second element 26, a read-out pulse is applied to the terminals 27, Fig. 1, for resetting the second stage. This energizes the read-out winding 28, which is effective to reverse the magnetic flux in the core 29, thereby inducing an output voltage pulse in the secondary winding 30 of the storage element 26. This, of course, is accompanied by the restoration of the storage element 26 to its "0" state.

The resetting of the storage element 26 to its "0" state causes a "back transfer" voltage pulse V2, Figs. 1 and 2, to be induced in the read-in winding 25, due to the flux reversal in the core 29. The polarity of this back transfer pulse (indicated by the dot at the bottom of winding 25, Fig. 1) is the same as that of a normal transfer pulse. This pulse, therefore, is not opposed by the diode 22 and tends to produce a flow of current through the output winding 21 of the first storage element 10. As indicated in Fig. 2, the back transfer pulse V2 has a magnitude which would be sufficient to significantly alter the magnetic flux in the core 11 of the first storage element 10, except for the fact that it is opposed by the electromotive force E of the battery 23. The relative magnitudes of the back transfer voltage V2 and the electromotive force E are such that the voltage V2 is prevented from reversing the magnetic flux in the core 11, thereby preventing a back transfer (to the first stage) of the binary "1" which is being read out of the second stage.

Figure 3:
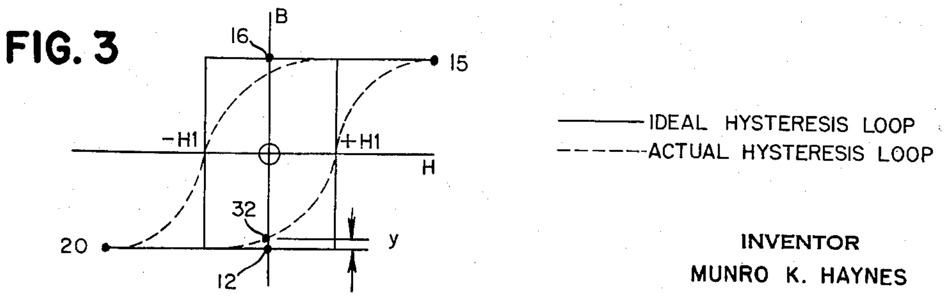
Fig. 3 is a diagram showing ideal and practical hysteresis loops for a core material used in a magnetic binary element.

Thus it will be seen that the battery 23 permits the passage of a normal transfer pulse V but discriminates against the smaller back transfer pulse V2. It also has another function. Referring to Fig. 3, the actual hysteresis loop of the core material employed in storage elements such as 10 is not a perfect rectangle, but is more nearly like the curve shown in dotted lines. Thus, the normal quiescent value of the magnetic flux density B would not actually be equal to the negative saturation value (point 12) but would instead be a lesser value as indicated at point 32. Let it be assumed now that a read-out pulse is applied to the storage element 10 at a time when a binary "0" is already stored therein. Under these conditions there should be no output voltage from the element 10. However, inasmuch as the core 11 is not in a completely saturated state, application of the read-out pulse to the winding 18 will produce a slight flux change, indicated by the incremental value $y$ in Fig. 3. This induces in the secondary winding 21 a "read-out zero" pulse V3 having the same polarity as a normal transfer pulse. The magnitude of this pulse V3, Fig. 2, may be such that, if unopposed, it would effect the false entry of a binary "1" into the second storage element 26. However, with the electromotive force E opposing the pulse V3, such a false entry is prevented.

In addition to the foregoing advantages, the use of the fixed voltage source 23, Fig. 1, enables the transfer circuit to be operated at or near ground potential, thereby minimizing insulation and safety problems. It should be noted further that the stray capacitance introduced into the transfer circuit by the voltage source 23 is negligible, so that the speed at which the transfer circuit operates is not adversely affected. It has been mentioned already that the power consumption of this transfer circuit is negligible. Because of all these factors, the design of a satisfactory transfer circuit utilizing the above-described principle is an exceedingly simple matter.

Another point to be noted in Fig. 1 and all of the other systems which are herein illustrated is that the transfer circuits are electrically isolated from the read-out windings. Hence, the read-out pulses do not enter the transfer circuits, and consequently it is not necessary to design the transfer circuits with a view to possible cross-coupling effects between read-out and transfer circuits.

The term "winding" as used herein does not necessarily imply a plurality of wire turns. It can be applied equally well to a single flux-linkage, such as would be afforded by a wire passing through a toroidal core. It is common practice in the art to pass the conductors through cores of this type to avoid the necessity of winding each individual core.

Figure 4:
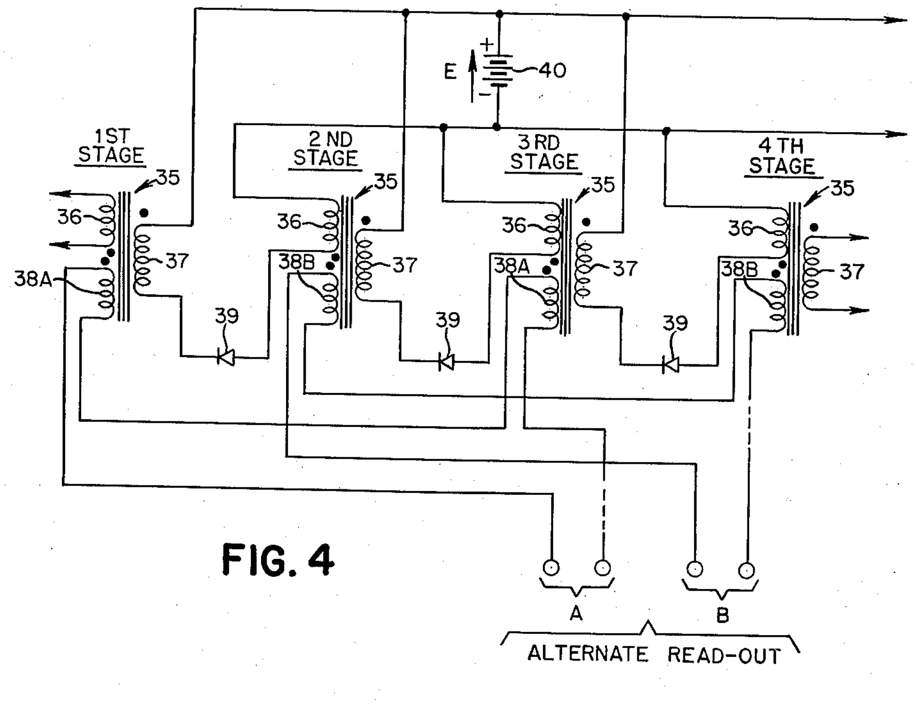
Fig. 4 is a schematic illustration of a shifting register utilizing magnetic binary elements in accordance with the invention.

Fig. 4 shows schematically the manner in which a shifting register or information delay line may be constructed in accordance with the principles of the invention. Only four stages of the register are here illustrated, although it is obvious that additional stages may be connected into the system without substantial change in the circuits. Each of the stages comprises a storage element 35 having a read-in winding 36, a secondary or output winding 37, and a read-out winding identified as either 38A or 38B depending upon whether the stage is odd-numbered or even-numbered. Intermediate each pair of adjacent stages is a transfer circuit comprising the output winding 37 of the lower stage, the read-in winding 36 of the higher stage, a diode 39 and a fixed voltage source represented by the battery 40, which voltage source is common to all of the stages.

Assuming a binary "1" is stored in the first stage and that it is desired to advance this stored "1" from stage to stage, a read-out pulse is applied first to the terminals A, Fig. 4. This causes all of the read-out windings 38A to be pulsed. Since the first stage is the only one in which a "1" is stored, in the present instance, it is only the winding 38A of this stage which is effective. The "1," therefore, is transferred from the first stage to the second stage. To transfer the "1" from the second stage to the third stage, a read-out pulse now is applied to the terminals B, causing all of the read-out windings 38B to be pulsed. The winding 38B in the second stage is the only one which is effective, causing the stored "1" to be read out of the second stage and transferred to the third stage. Thus, to transfer the binary "1" down the line, read-out pulses are applied alternately to the terminals A and B. Back transfers are prevented by the battery 40. As was the case with the circuit shown in Fig. 1, the battery 40 is not required to furnish any power, and it can serve a large number of transfer circuits without any undesirable cross-coupling effects, due to its low internal impedance.

Any arbitrary pulse pattern can be stored and transferred in the shifting register of Fig. 4, provided that binary "1's" are not entered into adjacent stages of the apparatus.

Figure 5:
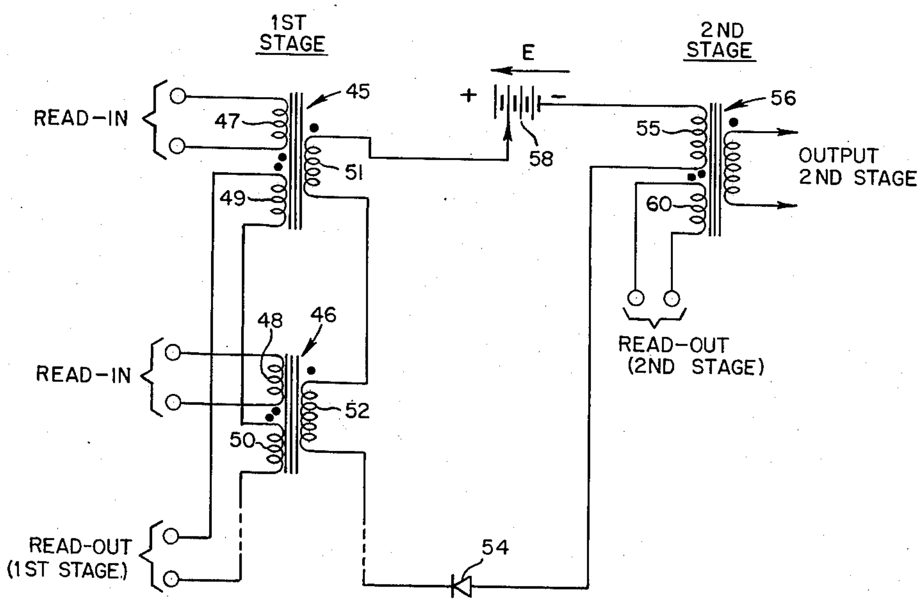
Fig. 5 is a schematic illustration of a logical "and" circuit utilizing magnetic binary elements in accordance with the invention.
Figure 6:
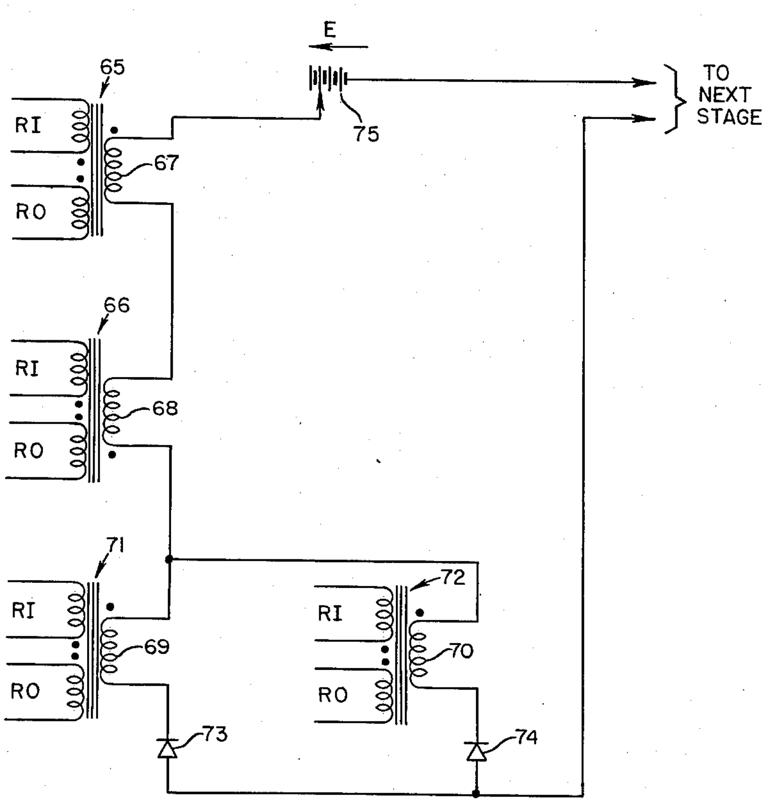
Fig. 6 is a schematic illustration showing another form of logical circuit embodying the invention.

Figs. 5 and 6 illustrate the principle of combining in a single stage the outputs from a plurality of selectively activated magnetic binary elements, and accepting or rejecting the combined output on the basis of a predetermined standard.

Fig. 5 illustrates a logical "and" circuit in which the first stage comprises a plurality of storage elements such as 45 and 46, each of which is adapted to assume a binary "1" or "0" condition in response to the presence or absence of read-in pulses applied to the respective windings 47 and 48 of these storage elements. When a transfer is to be made from the first stage to the second stage, the read-out windings 49 and 50 are simultaneously pulsed, resetting to a "0" condition those storage elements which had previously been in a "1" condition. Transfer pulse voltages are induced in the secondary windings 51 and 52 of those storage elements in which a reversal of magnetic flux takes place during read-out. That is to say, an output voltage would be produced during read-out if a binary "1" had been stored in the element, but substantially no output voltage would be produced if a "0" had been stored therein.

The output voltages induced in the secondary windings 51 and 52 are added together in a series transfer circuit comprising a rectifier represented by the diode 54, the read-in winding 55 of the storage element 56 in the second stage, and a fixed voltage source represented by the battery 58, which furnishes a bias voltage for the diode 54. The term "fixed" voltage source is not meant to imply that the available electromotive force E of the voltage source 58 cannot be varied. It merely signifies that the source 58 is adapted to supply a steady or continuous voltage of dependable magnitude. The electromotive force E is adjusted to such a value that it can be overcome only when the combined output voltage of the storage elements 45 and 46 exceeds a certain threshold. This condition is fulfilled when all of the storage elements 45 and 46 in the first stage are simultaneously reset from their "1" states to their "0" states. However, the threshold established by the bias voltage E is great enough to discriminate against the combined output voltage of the first-stage storage elements (45, 46, and so forth) if one or more of these storage elements had been in a "0" condition prior to read-out.

Referring to Fig. 2, the combined transfer pulse produced in the circuit of Fig. 5 attains a magnitude V4 if all of the storage elements were in a "1" condition prior to read-out, and it has a lesser magnitude V5 if one or more of the storage elements had remained in the "0" condition. The output voltage V5 is insufficient to effect a reversal of the magnetic flux in the core of the second storage element 56, Fig. 5. Hence, it is rejected, whereas a transfer pulse having magnitude V4 would be accepted. Thus, the type of transfer circuit shown in Fig. 5 is particularly useful in logical circuitry for coincidence detection purposes.

The transfer circuit of Fig. 5 also has the other advantages which have been pointed out above in connection with the previously described transfer circuits. When the read-out winding 60 of the second storage element 56 is pulsed, a back transfer voltage is induced in the read-in winding 55, but this back transfer voltage is below the threshold established by the bias voltage E; therefore, it has no effect upon the storage elements 45 and 46 in the first stage. Spurious voltage pulses caused by minor flux changes in the cores of the storage elements 45 and 46 likewise are ineffective for the same reason.

Fig. 6 illustrates a type of "and-not" circuit having (in series with the and-not elements) a pair of "or" branches. In this instance the magnetic binary elements 65 and 66 are arranged with their output windings 67 and 68 connected together in a series-opposition relationship. These windings 67 and 68 also are connected in series with two parallel branches of the circuit that respectively include the output windings 69 and 70 of the magnetic binary elements 71 and 72. Diodes 73 and 74 are respectively included in these parallel branches, where they are connected in series with the windings 69 and 70, respectively. A fixed voltage source 75 furnishes a bias voltage E which is opposed to each of the diodes 73 and 74.

The arrangement in Fig. 6 is such that if a binary "1" is stored in each of the elements 65, 66, 71 and 72, the voltages induced in the windings 67, 69 and 70 during read-out will oppose the bias voltage E, whereas the voltage induced in the winding 68 during read-out will oppose the diodes 73 and 74. The voltage pulse induced in winding 68, during the read-out of a binary "1" from element 66, will hold the combined output voltage of the network to a value below the threshold established by the fixed bias voltage E. Hence, a normal transfer pulse cannot take place unless a binary "0" is stored in the element 66, and unless binary "1's" are stored also in the element 65 and in either (or both) of the elements 71 and 72.

Figure 7:
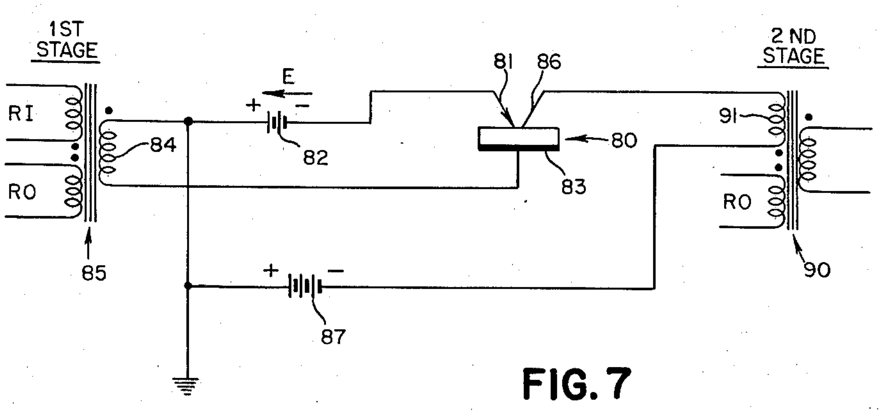
Fig. 7 illustrates still another embodiment of the invention, in which a semi-conductor amplifier is employed as a pulse discriminator.

Fig. 7 illustrates a type of information storage and transfer apparatus similar to any of the foregoing embodiments, except that in this instance the threshold value for transfer pulses is maintained by a germanium transistor 80 or other semi-conductor amplifier having an emitter

81 which is biased by a fixed voltage source 82. The emitter 81 and base 83 of the transistor 80 are connected in series with the output winding 84 of the magnetic binary storage element 85 in the first stage of the apparatus. (The first stage could also comprise a combination of elements, as in the case of a logical circuit.) The voltage induced in the winding 84 during the read-out of a binary "1" from the element 85 will overcome the bias voltage E of the source 82 and raise the potential of the emitter 81 (with reference to the base 83) to a level where conduction will take place between the base 83 and the collector 86 of the transistor 80. Power is furnished to the collector circuit during the read-out interval by a voltage source 87. While this circuit consumes a small amount of power during the read-out interval, it permits the first stage to be driven with very little power due to the amplification afforded by the transistor 80, thereby retaining the advantage of low power consumption which characterizes the previously described embodiments of the invention.

During the read-out of a binary "1" stored in the element 90 in the second stage, a back transfer pulse is induced in the read-in winding 91 of this element. The winding 91 is in the collector circuit of the transistor 80; however, the back transfer pulse is unable to produce a flow of current through this circuit because of the negative bias applied by the battery 82 to the emitter 81. The transistor 80, like the biased diodes described hereinabove, is effective also to suppress "read-out zero" pulses and other spurious pulses in the transfer circuit, and therefore can be employed as the full equivalent of a biased diode. It is furthermore evident that electron tubes can be employed in situations where power consumption and cost are not critical factors. The principal criterion to be observed is the ability of the transfer circuit to establish and maintain a fixed and reliable threshold voltage for discriminating against pulses which are not of the proper magnitude.

While there have been shown and described and pointed out the fundamental novel features of the invention as applied to several preferred embodiments, it will be understood that various omissions and substitutions and changes in the form and details of the devices illustrated and in their operation may be made by those skilled in the art, without departing from the spirit of the invention. It is the intention, therefore, to be limited only as indicated by the scope of the following claims.

What is claimed is:

1. Apparatus for transferring information by voltage pulses comprising a first magnetic storage means having alternate states of magnetic stability respectively corresponding to alternate active and inactive conditions of said first storage means, first read-in means for causing said first storage means to assume its active condition, first read-out means for resetting said first storage means to its inactive condition, second magnetic storage means having alternate states of magnetic stability respectively corresponding to alternate active and inactive conditions of said second storage means, second read-in means for causing said second storage means to assume its active condition, second read-out means for resetting said second storage means to its inactive condition, and a transfer circuit coupling said first storage means to said second storage means for causing said second storage means to assume its active condition when said first storage means is reset from its active to its inactive condition, said transfer circuit including an element which is electrically conductive in one direction only and having a fixed source of bias voltage for said element to establish a threshold of constant value for discriminating against voltage pulses in said circuit which do not have a given polarity and magnitude to render said transfer circuit ineffective to change said second storage means from the inactive state when said first storage means is in the inactive state and is reset.

2. Apparatus according to claim 1, wherein said element comprises a diode biased by said fixed voltage source to pass only the voltage pulse which exists in said transfer circuit when said first storage means is reset from an active to an inactive condition.

3. Apparatus according to claim 1, wherein said element comprises a semi-conductor amplifier biased by said fixed voltage source to pass only the voltage pulse which exists in said transfer circuit when said first storage means is reset from an active to an inactive condition.

4. Apparatus according to claim 1, wherein said first storage means comprises a plurality of magnetic binary elements having individual read-in means and common read-out means.

5. Apparatus for transferring information by voltage pulses comprising at least two magnetic storage elements, each including a core of magnetic material having two alternate states of magnetic stability respectively corresponding to alternate active and inactive conditions of the respective storage element, a read-in winding on each core adapted to be pulsed for causing the respective storage element to assume its active condition, a read-out winding on each core adapted to be pulsed for resetting the respective storage element to its inactive condition, an output winding on each core wherein voltage pulses are induced in response to changes in the magnetic state of the core, and a transfer circuit coupling the output winding of a first storage element to the read-in winding of a second storage element for causing said second storage element to assume its active condition when said first storage element is reset from its active condition to its inactive condition, said transfer circuit including a unidirectional current-controlling device which is responsive to the voltage pulse induced in said first output winding when said first storage element is reset, and a fixed voltage source for supplying a bias voltage to said device whereby said transfer circuit is caused to discriminate against voltage pulses which do not exceed a given threshold value and render said transfer circuit ineffective to change said second storage means from the inactive state when said first storage means is in the inactive state and is reset.

6. Apparatus according to claim 5, wherein said electrically conducting device is a diode connected in series with and opposed to said voltage source.

7. Apparatus according to claim 5, wherein said electrically conductive device is a semi-conductor amplifier having an emitter biased by said voltage source and connected to the output winding of said first storage element and having a collector connected to the read-in winding of said second storage element.

8. Apparatus for transferring information by voltage pulses comprising a plurality of magnetic binary elements each capable of assuming alternate active and inactive stable states, means for selectively activating said elements, reset means operable upon said elements for resetting each of the active elements to its inactive state, said elements being adapted to furnish an output voltage pulse having a magnitude determined by the respective states of said elements during the operation of said reset means, voltage-responsive means adapted to be controlled by said elements, and a coupling circuit for transferring the output voltage pulse from said elements to said voltage-responsive means, said circuit including a source of fixed and constant threshold voltage for suppressing voltage pulses having less than a predetermined magnitude to render said voltage-responsive means ineffective to the output voltage pulse produced when said elements are in the inactive state and are reset.

9. A shifting register comprising a series of magnetic storage elements, each including a core of magnetic material having two alternate states of magnetic stability respectively corresponding to alternate active and inactive conditions of the respective storage element, a read-in winding on each core adapted to be pulsed for causing the respective storage element to assume its active condition, a read-out winding on each core adapted to be pulsed for resetting the respective storage element to its inactive condition, an output winding on each core wherein voltage pulses are induced in response to changes in the magnetic state of the core, and a plurality of consecutive transfer circuits each coupling the output winding of one of said storage elements to the read-in winding of another of said storage elements for causing said other storage element to assume its active condition when said one storage element is reset to its inactive condition, each of said transfer circuits including a unidirectional current-controlling device conductive in the direction of a voltage pulse which is induced in said circuit when said one storage element therein is reset, and a common voltage source for supplying to the current-controlling devices in all of said transfer circuits a continuous bias voltage of fixed value for causing each transfer circuit to discriminate against induced voltage pulses therein which do not exceed a predetermined magnitude.

10. A logical circuit comprising a plurality of magnetic storage elements each adapted to assume alternate active and inactive conditions, means for selectively activating said storage elements, means for simultaneously resetting to an inactive condition all of the active storage elements, each of said storage elements comprising a transformer having a bistable magnetic core and a secondary winding thereon which furnishes an output voltage of predetermined polarity and magnitude when the respective storage element is reset from an active condition to an inactive condition, a voltage-responsive device, and common transfer means coupling all of said secondary windings to said voltage-responsive device, said transfer means including the combination of unidirectional current-controlling means and a fixed source of bias voltage therefor to discriminate against the combined output voltage of said storage elements except when said storage elements have been activated according to a predetermined pattern.

11. A logical "and" circuit comprising a plurality of magnetic storage elements each including a core of magnetic material having two alternate states of magnetic stability respectively corresponding to alternate active and inactive conditions of the respective storage element, a read-in winding on each core adapted to be pulsed for causing the respective storage element to assume its active condition, a read-out winding on each core adapted to be pulsed for resetting the respective storage element to its inactive condition, an output winding on each core wherein voltage pulses are induced in response to changes in the condition of the respective storage element, a voltage-responsive device, and a series circuit coupling the output windings of said magnetic storage elements to said voltage-responsive device, said series circuit including a rectifier conductive in the direction of the voltage pulses which are induced in said output windings when said magnetic storage elements are reset, and a fixed voltage source for supplying to said series circuit an electromotive force which biases said rectifier to discriminate against all induced voltage pulses in said series circuit except those which occur when all of said magnetic storage elements are reset simultaneously.

12. A two-stage logical circuit comprising, in the first stage thereof, a plurality of magnetic storage elements arranged to produce a single output voltage and comprising, in the second stage thereof, an individual magnetic storage element, each of said storage elements including a core of magnetic material having two alternate states of magnetic stability respectively corresponding to alternate active and inactive conditions of the respective storage element, a read-in winding on each core adapted to be pulsed for causing the respective storage element to assume its active condition, a read-out winding on each core adapted to be pulsed for resetting the respective storage element to its inactive condition, an output winding on each core wherein voltage pulses are induced in response to changes in the condition of the respective storage element, and transfer means coupling the output windings of said plurality of storage elements in the first stage to the read-in winding of said individual storage element in the second stage for causing said individual storage element to assume its active condition when said plurality of storage elements has been selectively activated and reset in accordance with predetermined logical conditions, said transfer means including unidirectional current-controlling means and a fixed voltage source supplying a constant bias voltage to said current-controlling means for measuring the output voltage of said first stage against a constant threshold voltage to determine whether said logical conditions are satisfied.

13. A magnetic memory circuit comprising a magnetic storage core, a magnetic temporary storage core, an output winding on said storage core, an input winding on said temporary storage core, and means including means connected in series with said windings for providing a voltage opposite in polarity to the voltage induced in said output winding when a "zero" stored in said storage core is shifted to said temporary storage core.

14. A magnetic memory circuit comprising a magnetic storage core, a magnetic temporary storage core, an output winding on said temporary storage core, an input winding on said storage core, and means including means connected in series with said windings for providing a voltage opposite in polarity to the voltage induced in said output winding when a "zero" stored in said temporary storage core is shifted to said storage core.

15. A magnetic memory circuit comprising a line of magnetic storage cores having output windings thereon, a line of magnetic temporary storage cores having corresponding input windings thereon, and means including means connected in series with corresponding output and input windings for providing a voltage opposite in polarity to the voltages induced in said output windings when "zeros" stored in said storage cores are shifted to said temporary storage cores.

16. A magnetic memory circuit comprising a line of magnetic storage cores having input windings thereon, a line of magnetic temporary storage cores having output windings thereon corresponding to said input windings, and means including means connected in series with corresponding output and input windings for providing a voltage opposite in polarity to the voltages induced in said output windings when "zeros" stored in said temporary storage cores are shifted to said storage cores.

17. A register for digital computing apparatus comprising a series of more than two magnetizable cores made of magnetic material exhibiting different stable states of residual flux density, means for inducing magnetization changes in the individual cores, electrical conductive links coupling said cores in cascade with each link coupling one core to a succeeding core for propagating magnetization changes from one core to another, a polarized device having a conductive threshold connected in series in each link for rendering the link sensitive to magnetization changes of only a single polarity and predetermined magnitude, the threshold in each polarized device being predetermined in relation to the ratio of the turns of the respective link round the first of two coupled cores to the turns of the link round the second of two coupled cores to confine the propagation of magnetization changes to both a single direction and predetermined magnitude.

18. A register for digital computing apparatus comprising a series of more than two magnetizable cores made of material exhibiting different stable states of residual flux density, means for inducing magnetization changes in the individual cores, electrical conductive links coupling said cores in cascade with each link coupling one core to a succeeding core for propagating magnetization changes from one core to another, a polarized device having a conductive threshold connected in series in each link for rendering the link sensitive to magnetization changes of only a single polarity and predetermined magnitude, the threshold in each polarized device being predetermined in relation to the ratio of the turns of the respective link round the first of two coupled cores to the turns of the link round the second of two coupled cores to confine the propagation of magnetization changes to both a single direction and predetermined magnitude, said polarized device comprising the series combination of a rectifier and a source of bias potential poled to augment the natural threshold of said rectifier.

19. A magnetic memory circuit comprising a magnetic storage core, a magnetic temporary storage core, said cores made of material exhibiting different stable states of remanent flux density, an output winding on said storage core, an input winding on said temporary storage core, and means including means connected in series with said windings for providing a voltage opposite in polarity to the voltages induced in said output winding when a "zero" or a "one" stored in said storage core is shifted to said temporary storage core, said opposite voltage being sufficient only to substantially cancel the voltage induced when a "zero" is shifted.

20. A magnetic memory circuit comprising a magnetic storage core, a magnetic temporary storage core, said cores made of material exhibiting different stable states of remanent flux density, an output winding on said temporary storage core, an input winding on said storage core, and means including means connected in series with said windings for providing a voltage opposite in polarity to the voltages induced in said output winding when a "zero" or a "one" stored in said temporary storage core is shifted to said storage core, said opposite voltage being sufficient only to substantially cancel the voltage induced when a "zero" is shifted.

21. A magnetic memory circuit comprising a line of magnetic storage cores having output windings thereon, a line of magnetic temporary storage cores having corresponding input windings thereon, said cores made of material exhibiting different stable states of remanent flux density, and means including means connected in series with corresponding output and input windings for providing a voltage opposite in polarity to the voltages induced in said output windings when "zeros" or "ones" stored in said storage cores are shifted to said temporary cores, said opposite voltage being sufficient only to substantially cancel the voltage induced when a "zero" is shifted.

22. A magnetic memory circuit comprising a line of magnetic storage cores having input windings thereon, a line of magnetic temporary storage cores having output windings thereon corresponding to said input windings, said cores made of material exhibiting different stable states of remanent flux density, and means including means connected in series with corresponding output and input windings for providing a voltage opposite in polarity to the voltages induced in said output windings when "zeros" or "ones" stored in said temporary storage cores are shifted to said storage cores, said opposite voltage being sufficient only to substantially cancel the voltage induced when a "zero" is shifted.

23. A magnetic switch comprising first and second magnetic cores each being capable of having positive and negative stable magnetic states, said first magnetic core being in its positive stable magnetic state and said second core being in its negative stable magnetic state, bias means so intercoupling said first and second magnetic cores that a reversal in the magnetic state polarity of one magnetic core reverses the magnetic state polarity of the other core but any lesser change in magnetic state of one core will not affect the other, said bias means including a source of bias potential connected to said first and second magnetic cores and first and second rectifier means each connected to a respective one of said first and second magnetic cores and in series with said source of bias potential, said source of bias potential being connected to said rectifier means in such a manner as to oppose the flow of any current therethrough, and means for applying electrical pulses of a given polarity and magnitude alternately to said first and second cores for alternately reversing the magnetic state polarity of said cores.

24. A magnetic switch according to claim 23, wherein the material of said first and second magnetic cores is a ferrite and the ratio of the slope of the sides of the hysteresis curve of the material of the scope of either the top or bottom of the curve is of at least six.

25. A magnetic switch comprising a plurality of magnetic cores each being capable of having positive and negative stable magnetic states, one of said magnetic cores being in a stable magnetic state of given polarity and each of the remaining cores being in a stable magnetic state opposite in polarity to the given magnetic state polarity of said one core, each of said magnetic cores respectively having an input winding, an output winding, and a pulse winding, the pulse windings of one set of alternate cores being connected in series and the pulse windings of the other set of alternate cores also being connected in series, the output winding of each core being so coupled to the input winding of the next core that the cores form a circuit in which a current induced in any output coil, due to a change in magnetic state polarity of its associated core, will tend to cause a reversal in the magnetic state polarity of the next core in the circuit, bias means connected between the input and output coils of said magnetic cores for biasing said cores so that only a complete reversal of magnetic state polarity of one core will reverse the magnetic state polarity of the next core in the circuit, and means for applying electrical pulses of a given polarity and magnitude alternately to the two respective sets of series-connected pulse windings for reversing the stable magnetic state polarity of any core having said given polarity.

26. A magnetic switch according to claim 25, wherein the magnetic material of said magnetic cores is a ferrite and the ratio of the slope of the sides of the hysteresis curve of the material to the slope of either the top or bottom of the curve is at least six.

References Cited in the file of this patent

UNITED STATES PATENTS

| | | |
|---|---|---|
| 2,533,001 | Eberhard | Dec. 5, 1950 |
| 2,591,406 | Carter et al. | Apr. 1, 1952 |
| 2,652,501 | Wilson | Sept. 15, 1953 |
| 2,683,819 | Rey | July 13, 1954 |
| 2,708,722 | An Wang | May 17, 1955 |

OTHER REFERENCES

Progress Report (2) on the EDVAC; vol. II, pub. June 30, 1946, Moore School of Electrical Engineering, U. of Pa., Phila., Pa., esp. par. 4.2.12 etc., and Figs. 17*a*, *b*, and *c*.

Progress Report No. 2, covering period Aug. 10, 1948, to Nov. 10, 1948, of The Computation Laboratory, Harvard University, entitled "Investigations for Design of Digital Calculating Machinery," pp. IV–7 to IV–19.

"Static Magnetic Storage Delay Line," by An Wang and Way Dong Woo, Journal of Applied Physics, vol. 21, January 1950, pp. 49–54.

Paper #150, presented at IRE National Convention, March 5, 1952, pp. 5–8, Figs. 5–8.